US008542390B2

(12) United States Patent
Takahashi et al.

(10) Patent No.: US 8,542,390 B2
(45) Date of Patent: Sep. 24, 2013

(54) CONTENT PRINTING SYSTEM, PRINT RELAY SYSTEM, CONTROL METHOD, AND STORAGE MEDIUM

(75) Inventors: Takeshi Takahashi, Yokohama (JP); Jun Otsuka, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/169,227

(22) Filed: Jun. 27, 2011

(65) Prior Publication Data

US 2012/0019855 A1 Jan. 26, 2012

(30) Foreign Application Priority Data

Jul. 21, 2010 (JP) ................................ 2010-164057

(51) Int. Cl.
*G06F 3/12* (2006.01)

(52) U.S. Cl.
USPC ................ 358/1.15; 358/1.9; 718/1; 718/108

(58) Field of Classification Search
USPC .................................................. 358/1.1–3.29
See application file for complete search history.

(56) References Cited

U.S. PATENT DOCUMENTS

| | | | | |
|---|---|---|---|---|
| 6,075,615 | A | 6/2000 | Nakamura | |
| 2001/0030766 | A1 | 10/2001 | Yamamoto | |
| 2002/0186408 | A1 | 12/2002 | Nakaoka | |
| 2003/0123084 | A1 * | 7/2003 | Brossman et al. | 358/1.15 |

FOREIGN PATENT DOCUMENTS

| | | | |
|---|---|---|---|
| EP | 1569416 | A1 | 8/2005 |
| JP | 2003196054 | A | 7/2003 |

* cited by examiner

*Primary Examiner* — Benny Q Tieu
*Assistant Examiner* — Marcellus Augustin
(74) *Attorney, Agent, or Firm* — Canon USA, Inc., IP Division

(57) ABSTRACT

A print relay system capable of connecting to an image forming apparatus and a print service system, which is provided by a vendor that publishes a unique specification for executing data communication with the image forming apparatus includes an acquisition unit configured to, in response to the print service system receiving a printing instruction input by a user via a client, acquire data from the print service system according to a first specification, which is the unique specification for data communication between the print service system and a relay virtual printer, and a transmission unit configured to transmit the data acquired by the acquisition unit from the relay virtual printer to the image forming apparatus according to a second specification for executing data communication between the relay virtual printer and the image forming apparatus.

6 Claims, 16 Drawing Sheets

| Service Name |
| --- |
| Print Service A |
| Print Service B |

FIG.8B

| 1301 | 1302 | 1303 | 1304 | 1305 | 1306 | 1307 |
| --- | --- | --- | --- | --- | --- | --- |
| virtual printer id | Service Name | real printer id | printer kind | Service printer id | name | capabilities |
| VP8CH-67YXF-42BBF-2TQ44-9H8XA | Print Service A | MP8CH-67YXF-42BBF-2TQ44-9H8XA | AAA | 3432682791683548017 | Printer 1 | • • • • |
| VP8CH-67YXF-42BBF-2TQ44-9H9XA | Print Service A | MP8CH-67YXF-42BBF-2TQ44-9H9XA | AAB | 3432682791683548018 | Printer 2 | • • • • |
| VP8CH-67YXF-42BBF-2TQ44-9H10XA | Print Service A | MP8CH-67YXF-42BBF-2TQ44-9H10XA | AAC | 3432682791683548019 | Printer 3 | • • • • |
| VP8CH-67YXF-42BBF-2TQ44-9H11XA | Print Service B | MP8CH-67YXF-42BBF-2TQ44-9H11XA | AAD | 3432682791683548020 | Printer 4 | • • • • |
| VP8CH-67YXF-42BBF-2TQ44-9H12XA | Print Service B | MP8CH-67YXF-42BBF-2TQ44-9H12XA | AAE | 3432682791683548021 | Printer 5 | • • • • |

FIG.8C

| 1401 | 1402 | 1403 | 1404 | 1405 | 1406 |
| --- | --- | --- | --- | --- | --- |
| service printer id | name | capabilities | VPID | USER NAME | PASSWORD |
| 3432682791683548017 | Printer 1 | • • • • | VP8CH-67YXF-42BBF-2TQ44-9H8XA | User A | User A |
| 3432682791683548018 | Printer 2 | • • • • | VP8CH-67YXF-42BBF-2TQ44-9H9XA | User A | User A |
| 3432682791683548019 | Printer 3 | • • • • | VP8CH-67YXF-42BBF-2TQ44-9H10XA | User A | User A |
| 3432682791683548020 | Printer 4 | • • • • | VP8CH-67YXF-42BBF-2TQ44-9H11XA | User A | User A |
| 3432682791683548021 | Printer 5 | • • • • | VP8CH-67YXF-42BBF-2TQ44-9H12XA | User B | User B |

FIG.10A

```
<Capabilities>
  <Duplex>
    <Item>1-Side</Item>
    <Item>2-Side</Item>
  </Duplex>
  <Color>
    <Item>mono</Item>
    <Item>color</Item>
  </Color>
  <PaperSize>
    <Item>B5</Item>
    <Item>A4</Item>
    <Item>A3</Item>
  </PaperSize>
</Capabilities>
```

FIG.10B

```
<PrintSettings>
  <Duplex>
    <Item>2-Side</Item>
  </Duplex>
  <Color>
    <Item>mono</Item>
  </Color>
  <PaperSize>
    <Item>A4</Item>
  </PaperSize>
</PrintSettings>
```

FIG.10C

```
<PrintJob>
  <id>
    <Item>5846759561318635695</Item>
  </id>
  <title>
    <Item>Doc1</Item>
  </title>
  <status>
    <Item>QUEUED</Item>
  </status>
  <dataUrl>                                              1701
    <Item>http://prt.srv.com/data/5846759561318635695</Item>
  </dataUrl>
  <settingUrl>                                           1702
    <Item>http://prt.srv.com/setting/5846759561318635695</Item>
  </settingUrl>
</PrintJob>
```

FIG.10D

```
<PrintJob>
  <id>
    <Item>5846759561318635695</Item>
  </id>
  <title>
    <Item>Doc1</Item>
  </title>
  <status>
    <Item>QUEUED</Item>
  </status>
  <dataUrl>                                              1703
    <Item>http://vprinter.com/VP8CH67YXF42BBF2TQ449H8XA
      /data/5846759561318635695</Item>
  </dataUrl>
  <settingUrl>                                           1704
    <Item>http://vprinter.com/VP8CH67YXF42BBF2TQ449H8XA
      /setting/5846759561318635695</Item>
  </settingUrl>
</PrintJob>
```

FIG.11A

```
"Capabilities": [
 {
  "Duplex": "1-Side",
  "Duplex": "2-Side",
  "Color": "mono",
  "Color": "color",
  "PaperSize": "B5",
  "PaperSize": "A4",
  "PaperSize": "A3"
 }
]
```

FIG.11B

```
"PrintSettings": [
 {
  "Duplex": "2-Side",
  "Color": "mono",
  "PaperSize": "A4"
 }
]
```

FIG.11C

```
"jobs": [
 {
  "id": "58467595613186356695",
  "title": "Doc1",
  "status": "QUEUED",
  "dataUrl": "http://prt.srv.com/data/58467595613186356695",
  "settingUrl": "http://prt.srv.com/setting/58467595613186356695"
 }
]
```

```
"jobs": [
 {
  "id": "58467595613186356695",
  "title": "Doc1",
  "status": "QUEUED",
  "dataUrl": "http://vprinter.com/VP8CH67YXF42BBF2TQ449H8XA/data/58467595613186356695",
  "settingUrl": "http://vprinter.com/VP8CH67YXF42BBF2TQ449H8XA/setting/58467595613186356695"
 }
]
```

```
<PrintSettings>
    <Duplex>
        <Item>2-Side</Item>
    </Duplex>
    <Color>
        <Item>mono</Item>
    </Color>
    <PaperSize>
        <Item>A4</Item>
    </PaperSize>
</PrintSettings>
```

FIG.16B

```
<Job>
    <id>5846759561318635695</id>
    <name>
        <Item>Doc1</Item>
    </name>
    <status>
        <Item>QUEUED</Item>
    </status>                                                   1701
    <data>
        <Item>http://prt.srv.com/data/5846759561318635695</Item>
    </data>                                                        1702
    <printSetting>
        <Item>http://prt.srv.com/setting/5846759561318635695</Item>
    </printSetting>
</Job>
```

CONTENT PRINTING SYSTEM, PRINT RELAY SYSTEM, CONTROL METHOD, AND STORAGE MEDIUM

BACKGROUND OF THE INVENTION

1. Field of the Invention

The present invention relates to a content printing system, a print relay system, and a control method.

2. Description of the Related Art

A conventional system, in which a client transmits a print instruction to a server and the server converts content to be printed into print data according to the received instruction, has been used. Japanese Patent Application Laid-Open No. 2003-196054 discusses a method in which a server receives a print instruction and information for controlling printing from a client and generates print data based on the print control information. The server according to Japanese Patent Application Laid-Open No. 2003-196054 provides a service for generating the print data to the client.

As described above, a conventional method in which a server provides a service to a client has been used. Cloud computing, which has been recently used, is one of the methods in which a server provides a service to a client. A cloud computing method characteristically executes data conversion and data processing in a distributed manner by using a large number of computing resources to implement simultaneous processing of requests input from a large number of clients.

Recently, various vendors provide diverse services by using a web service implemented on a cloud computing environment, which implements the above-described cloud computing. Among the various vendors, Google® attracts much attention.

Google® has executed active marketing. More specifically, Google® has established a large number of large data centers and is proposing a service provided in interlock with a device. In addition, Google® has developed a method for implementing data communication between the device and its service environment.

More specifically, Google® has developed a method for executing data communication for providing a service in interlock with an image forming apparatus. Furthermore, Google® has published an interface for executing data communication between an image forming apparatus and a cloud computing environment provided by Google®.

If the interface is implemented on an image forming apparatus, it becomes unnecessary to install a printer driver on a client as discussed in Japanese Patent Application Laid-Open No. 2003-196054. In addition, if the interface is implemented on an image forming apparatus, even when the image forming apparatus and the server are connected to each other via the Internet, the user can designate an image forming apparatus from the client to cause the designated image forming apparatus to execute printing.

SUMMARY OF THE INVENTION

According to an aspect of the present invention, a print relay system capable of connecting to an image forming apparatus and a print service system, which is provided by a vendor that publishes a unique specification for executing data communication with the image forming apparatus includes an acquisition unit configured to, in response to the print service system receiving a printing instruction input by a user via a client, acquire data from the print service system according to a first specification, which is the unique specification for data communication between the print service system and a relay virtual printer, and a transmission unit configured to transmit the data acquired by the acquisition unit from the relay virtual printer to the image forming apparatus according to a second specification for executing data communication between the relay virtual printer and the image forming apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 8A illustrates an example of print service information. FIG. 8B illustrates an example of information stored by a print service information management unit. FIG. 8C illustrates an example of information stored by a printer information storage unit.

FIG. 10A illustrates an example of an element <Capabilities> expressed in the eXtended Markup Language (XML) format. FIG. 10B illustrates an example of print setting expressed in the XML format. FIG. 10C illustrates an example of notification information A expressed in the XML format. FIG. 10D illustrates an example of notification information B expressed in the XML format.

FIG. 11A illustrates an example of an element <Capabilities> expressed in the JavaScript Object Notation (JSON) format. FIG. 11B illustrates an example of print setting expressed in the JSON format. FIG. 11C illustrates an example of notification information A expressed in the JSON format. FIG. 11D illustrates an example of notification information B expressed in the JSON format.

FIG. 16A illustrates an example of notification information A received by a communication module A. FIG. 16B illustrates an example of a print setting received by the communication module A.

DESCRIPTION OF THE EMBODIMENTS

Various exemplary embodiments, features, and aspects of the invention will be described in detail below with reference to the drawings.

In a first exemplary embodiment of the present invention, a print relay system is provided between an environment of a vendor that provides an interface and an image forming apparatus.

Figure 1:
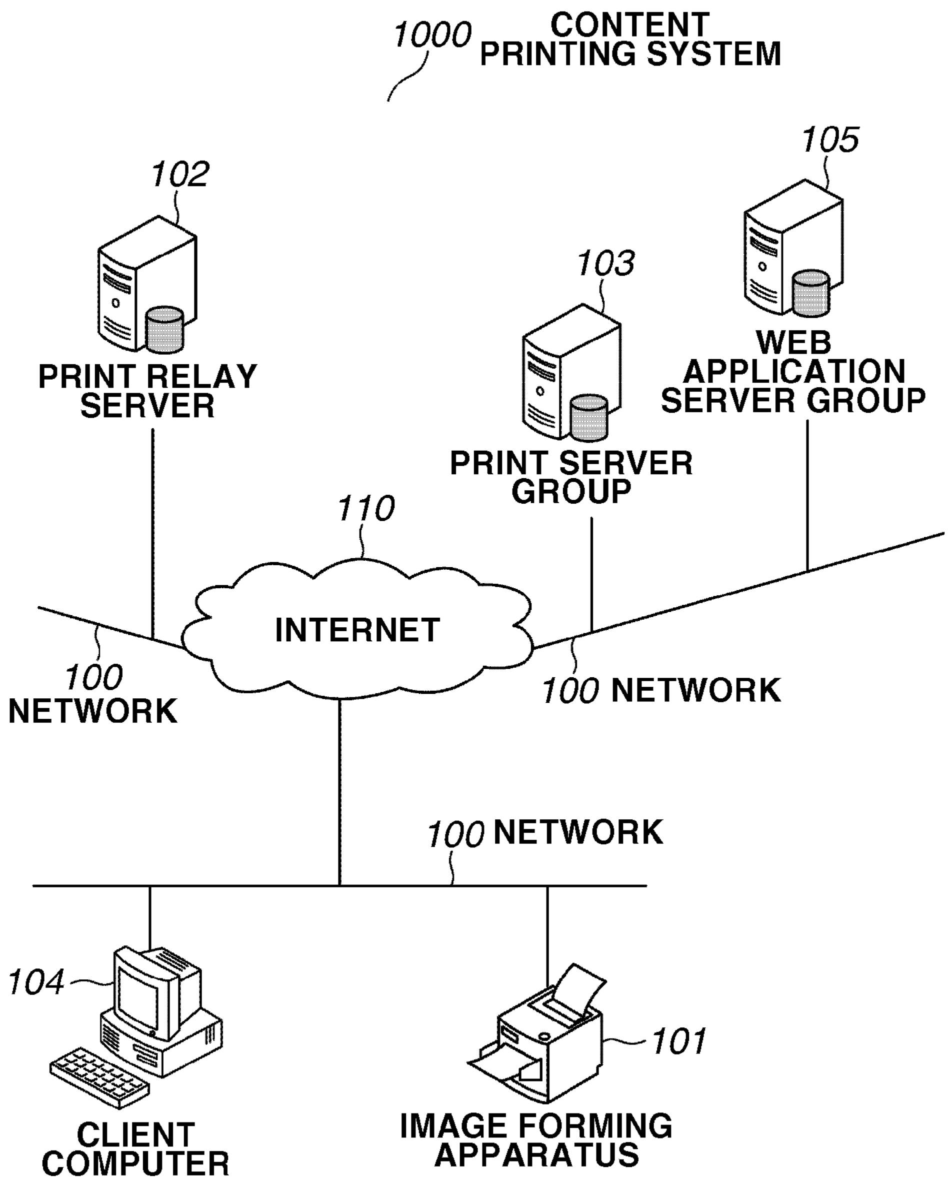
FIG. 1 illustrates an exemplary configuration of a content printing system according to a first exemplary embodiment of the present invention.

To begin with, an exemplary configuration of a content printing system 1000 according to the present exemplary embodiment will be described in detail below with reference to FIG. 1. FIG. 1 illustrates an exemplary configuration of the content printing system 1000.

Referring to FIG. 1, the content printing system 1000 includes a client computer 104 and an image forming apparatus 101. The client computer 104 and the image forming apparatus 101, which are installed in a user environment, are in communication with each other via a network 100. The network 100 is connected to the Internet 110.

In addition, the content printing system 1000 includes a web application server group 105 and a print server group 103. The web application server group 105 and the print server group 103 are server groups provided by the same vendor and are in communication with each other via the network 100. The network 100 is connected to the Internet 110.

In the present exemplary embodiment, the two server groups are in communication with each other via the network 100 as described above. However, alternatively, the web application server group 105 and the print server group 103 can be connected via the Internet 110.

In addition, the content printing system 1000 includes a print relay server 102. The print relay server 102 is connected to the network 100. The network 100 is connected to the Internet 110.

Each apparatus and each server group included in the content printing system 1000 can be connected to one another via the Internet to implement a bidirectional data communication. In the present exemplary embodiment, it is supposed that one apparatus is provided as each of the above-described apparatuses. However, alternatively, a plurality of apparatuses can be used for each of the above-described apparatuses. Furthermore, in the present exemplary embodiment, it is supposed that each server group is constituted by a plurality of servers. However, alternatively, one server can constitute each server group. The print server group 103 is equivalent to a print service system.

Now, an exemplary hardware configuration of each apparatus and each server group included in the content printing system 1000 will be described in detail below with reference to FIG. 2.

Figure 2:
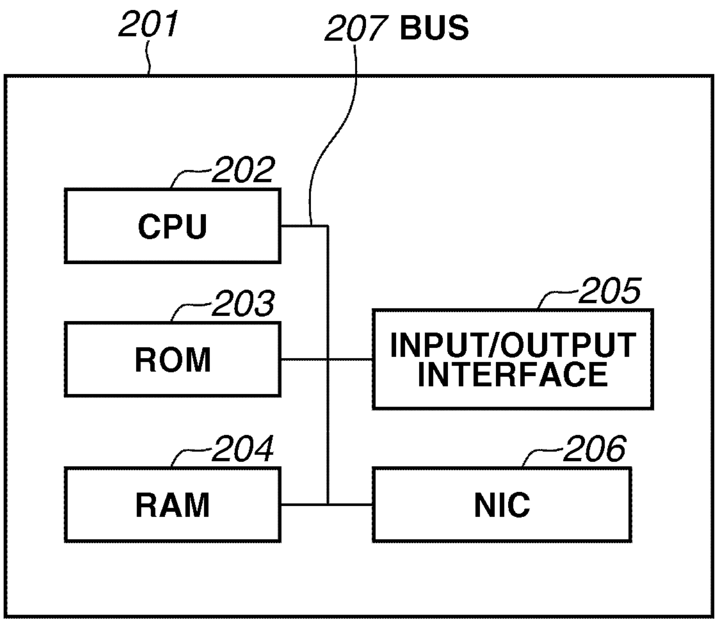
FIG. 2 illustrates an exemplary hardware configuration of each apparatus and each server group, which are included in the content printing system according to the first exemplary embodiment of the present invention.

FIG. 2 illustrates an exemplary hardware configuration of each apparatus and each server group which constitute the content printing system 1000.

Each apparatus and each server group 201 are included in the content printing system 1000. A central processing unit (CPU) 202 executes various programs to implement various functions. A read-only memory (ROM) 203 is a unit configured to store various programs.

A random access memory (RAM) 204 is used by the CPU 202 in executing various programs. More specifically, the CPU 202 loads and executes a program from the ROM 203 on the RAM 204. In addition, the RAM 204 is a unit used as a work area and a temporary storage area for the CPU 202.

An input/output (I/O) interface 205 is configured to transmit data to a display (not illustrated), which is connected to each apparatus and each server group. The I/O interface 205 is an interface unit configured to receive data input via a pointing device (not illustrated). A network interface card (NIC) 206 is a unit configured to connect each apparatus and each server group included in the content printing system 1000 to the network 100. The above-described units can execute bidirectional data communication via the bus 207.

In addition, the image forming apparatus 101 includes a printing unit (not illustrated). The printing unit can transmit and receive data to and from each of the above-described units via the bus 207. The printing unit is a unit capable of printing a raster image on a recording medium.

Figure 3:
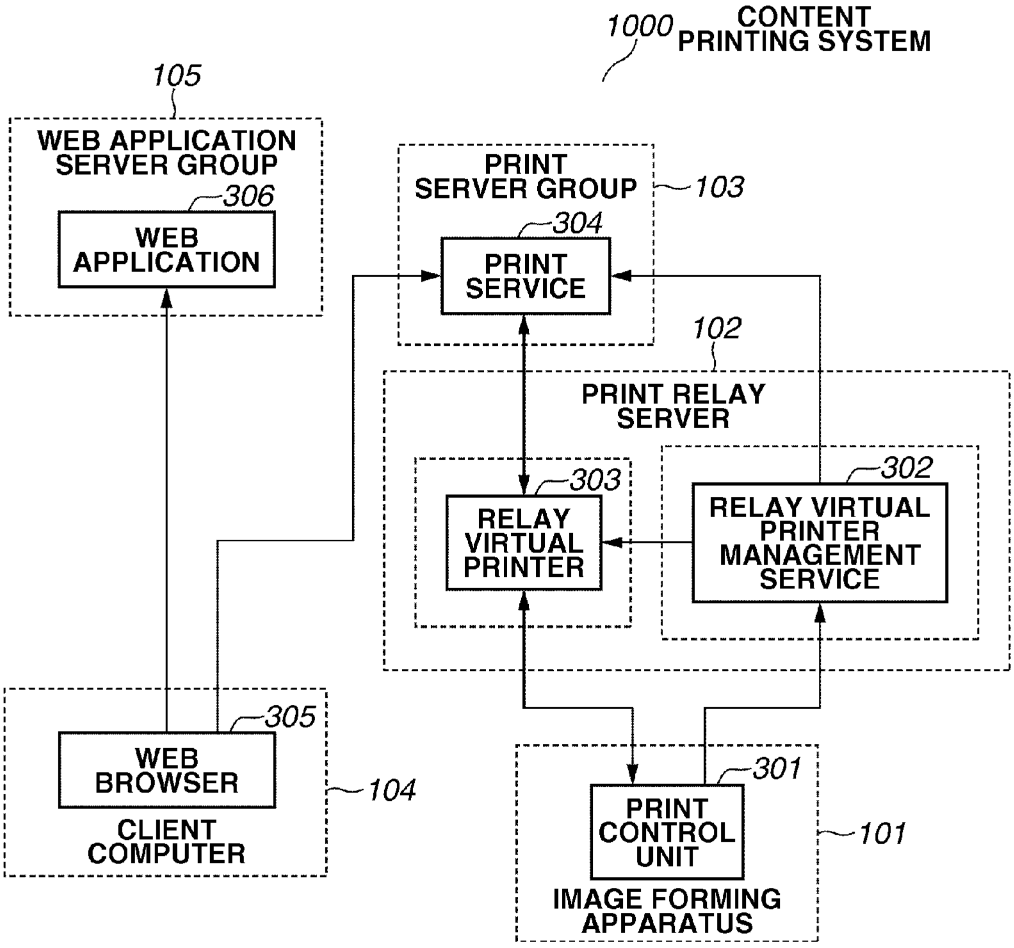
FIG. 3 illustrates an exemplary software configuration of each apparatus and each server group, which are included in the content printing system.

Now, exemplary functions of each apparatus and each server group included in the content printing system 1000 will be described in detail below with reference to FIG. 3. FIG. 3 illustrates an exemplary software configuration of each apparatus and each server group, which are included in the content printing system 1000.

A program that can implement the function of each software configuration illustrated in FIG. 3 is stored on the ROM 203 of each apparatus and each server group. The CPU 202 loads and executes the program on the RAM 204 to implement the function.

The functions of each apparatus and each server group will be described. The functions described below are categorized into the following two categories in a large sense.

The functions of the first category are functions categorized in a registration function category, which are configured to register the image forming apparatus 101 to the print relay server 102, configured to implement a relay virtual printer 303 on the print relay server 102, and configured to register the relay virtual printer 303 to a print service 304.

On the other hand, the functions of the second category are functions categorized in a print function category, which are configured to transmit an instruction for printing a content generated by the web application server group 105 to the print server group 103 and configured to print the print data transmitted by the print server group 103 to the image forming apparatus 101.

In printing the print data transmitted by the print server group 103 to the image forming apparatus 101, the print server group 103 transmits the print data to the image forming apparatus 101 via the print relay server 102, which functions as a data transfer server, and the print data is printed by the image forming apparatus 101.

To begin with, the functions which are categorized into the registration function category will be described in detail below. More specifically, in the following description, the functions of the image forming apparatus 101, which are categorized into the registration function category, will be described in detail below.

Figure 4:
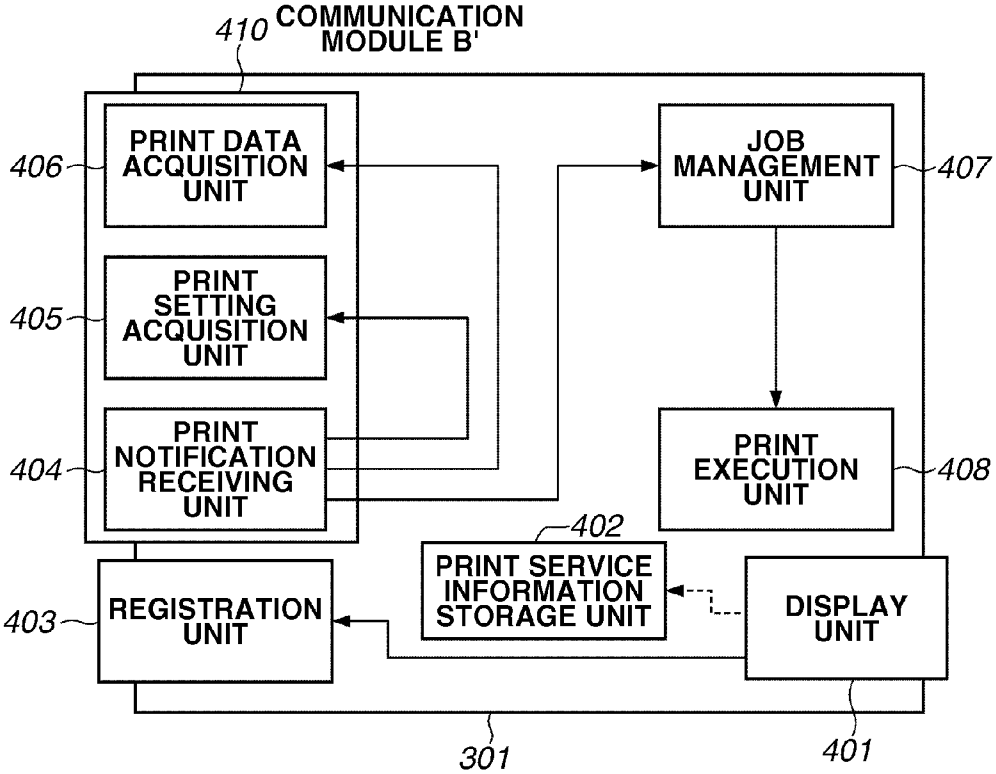
FIG. 4 illustrates exemplary functions implemented by a print control unit.

The image forming apparatus 101 includes a print control unit 301. The print control unit 301 implements each function illustrated in FIG. 4. Referring to FIG. 4, the display unit 401 displays various screens. A print service information storage unit 402 includes print service information.

FIG. 8A illustrates an example of print service information. In the example illustrated in FIG. 8A, information about a plurality of print services is illustrated. The print service 304 according to the present exemplary embodiment is equivalent to a print service A.

Figure 9A:
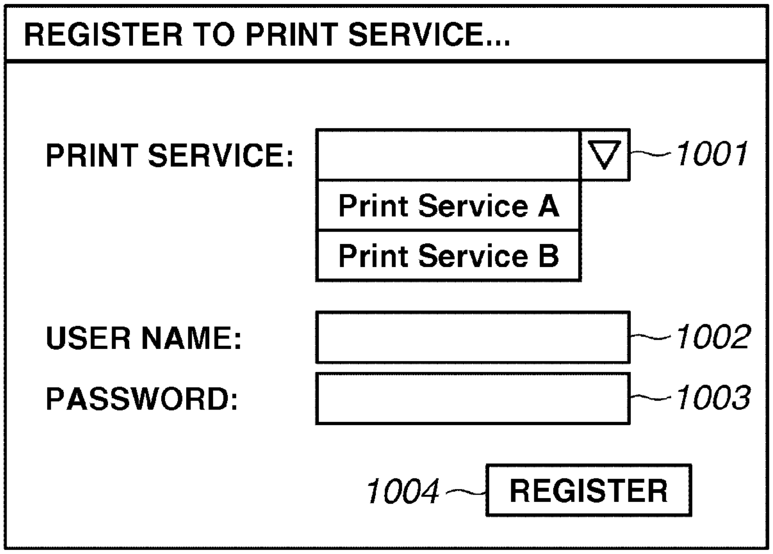
FIG. 9A illustrates an example of a registration user interface (UI).

If the display unit 401 is instructed by the user to register the image forming apparatus 101 to the print service 304, the display unit 401 generates and displays a UI for registering the image forming apparatus 101 to a print service as illustrated in FIG. 9A based on the information illustrated in FIG. 8A.

The user selects a print service to which the user desires to register the image forming apparatus 101 via the UI screen illustrated in FIG. 9A. Contrary to what is shown in FIG. 9A, in the present exemplary embodiment only one print service, i.e., the print service A, exists. Accordingly, the user cannot select a print service other than the print service A. For an embodiment in which more than one print service exists (service B), please refer to the description of the second embodiment below.

The user inputs a user identification data (ID) and a password for the selected print service in fields 1002 and 1003 (FIG. 9A) and presses a registration button 1004. When the user has pressed the registration button 1004, a registration unit 403 issues registration information.

In addition, the registration unit 403 transmits the issued registration information to a request reception unit 501 included in a relay virtual printer management service 302, which will be described in detail later below. The functions not described above will be described in detail below.

The registration information will be described in detail below. A print service name is included in the registration information. The print service name is the information for identifying the print service selected by the user. Furthermore, the print service name is information for identifying the print service 304 provided by the print server group 103.

In addition, the user ID and the password are included in the registration information. The user ID and the password are information required for the user to utilize the print service 304 and the web application server group 105. In the following description, the user ID and the password are collectively referred to as "user information".

In the present exemplary embodiment, it is supposed that the same vendor provides the web application server group 105 and the print server group 103. Accordingly, if the user utilizes a service provided by both the web application server group 105 and the print server group 103, the user can use the same user information. In the present exemplary embodiment, it is supposed that the user has previously registered the user information to the web application server group 105.

In addition, the registration information includes a real printer ID (RPID), which is unique identification information assigned to the image forming apparatus 101. Unique identification information is assigned to each image forming apparatus (not illustrated) including the image forming apparatus 101. Each image forming apparatus is identified by the identification information.

In the present exemplary embodiment, the installation location of the image forming apparatus can be identified by identifying the RPID. In addition, an element <PrinterKind>, which is model information about the image forming apparatus 101, is included in the registration information.

Image forming apparatuses of the same model are assigned with the same model information. More specifically, if two image forming apparatuses are provided with the same communication module B', the image forming apparatuses are determined as the same model. The communication module B', a communication module A, a communication module A', and a communication module B will be described in detail below.

In addition, a printer name of the image forming apparatus 101 is included in the registration information. The printer name is the name assigned to the image forming apparatus 101 and is used as the name of the image forming apparatus 101. Unlike the identification information, the printer name may be the same for each image forming apparatus.

In addition, an element "Capabilities" is included in the registration information. The element <Capabilities> includes various information, such as information about whether the image forming apparatus 101 can execute two-sided printing, whether the image forming apparatus 101 can execute color printing, and the size of the paper that can be output on the image forming apparatus 101.

The element <Capabilities> is transmitted to the request reception unit 501 in the XML format as illustrated in FIG. 10A. Referring to FIG. 10A, an element <Item> describes the capacity of the image forming apparatus 101. More specifically, in the example illustrated in FIG. 10A, the image forming apparatus 101 is capable of executing imposition printing and color printing. In addition, it is indicated by the element <Capabilities> that the image forming apparatus 101 is capable of executing an output by using the paper of B5, A4, and A3 sizes.

Now, the functions of the print relay server 102, which are categorized in the registration function category, will be described in detail below.

Figure 5:
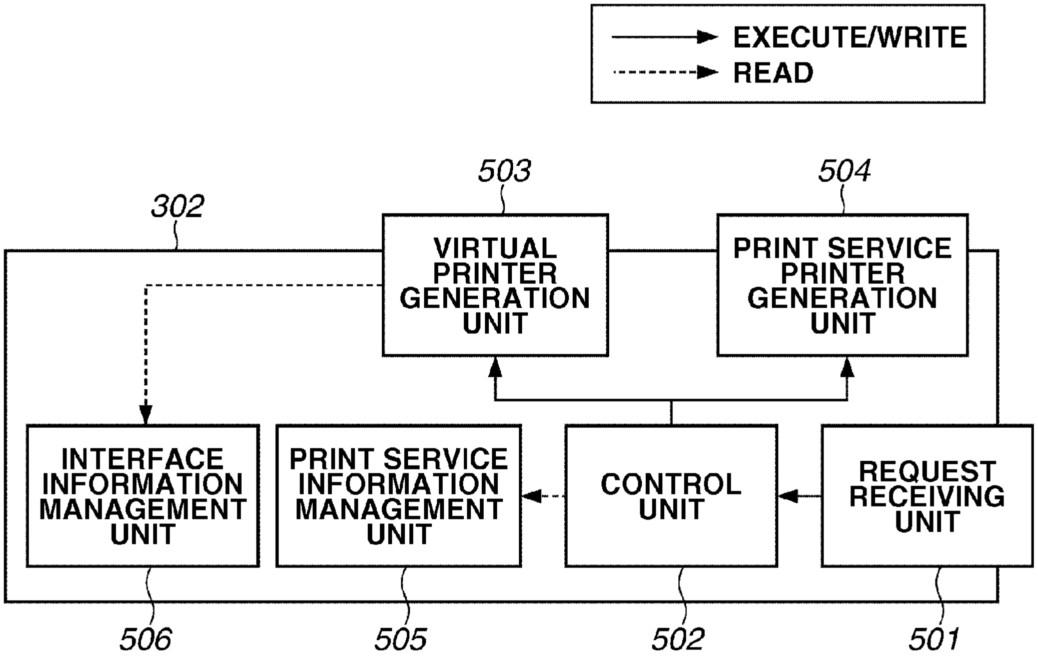
FIG. 5 illustrates exemplary functions implemented by a relay virtual printer management service unit.

The print relay server 102 includes the relay virtual printer management service 302. The relay virtual printer management service 302 implements each function illustrated in FIG. 5.

The request reception unit 501 receives the registration information. A control unit 502 acquires the registration information received by the request reception unit 501. In addition, the control unit 502 interprets the registration information. Furthermore, the control unit 502 outputs an instruction to the virtual printer generation unit 503 and a print service printer generation unit 504 for executing the following two types of processing.

The first processing is processing executed by the virtual printer generation unit 503 to implement the function of the relay virtual printer 303. The second processing is processing executed by the print service printer generation unit 504 to register information about the relay virtual printer 303 to the print service 304.

The first processing, i.e., the processing executed by the virtual printer generation unit 503 to implement the function of the relay virtual printer 303 will be described in detail below. The relay virtual printer 303 implements each function illustrated in FIG. 6, which will be described in detail below.

The virtual printer generation unit 503 identifies and acquires a communication module B 602, which has been stored on an interface information management unit 506 based on the element <PrinterKind> transmitted from a control unit 706. In addition, the virtual printer generation unit 503 identifies and acquires a communication module A' 601, which has been stored on the interface information management unit 506 based on the print service name.

The communication module B is a module for executing a communication with the image forming apparatus 101. Because the same model has the same communication module B, the communication module B can be identified by referring to the element <PrinterKind>. The communication module B communicates with a communication module B' 410 included in the print control unit 301.

The communication module A' 601 is a module for executing a communication with the print server group 103. The communication module A' 601 can communicate with a communication module 707 included in the print service 304.

After acquiring the two communication modules, the virtual printer generation unit 503 implements a process (thread) in which the two communication modules are loaded. The process is equivalent to the relay virtual printer 303.

After implementing the relay virtual printer 303, the virtual printer generation unit 503 issues a virtual printer ID (VPID), which is identification information for identifying the implemented relay virtual printer 303. The issued VPID is transmitted to the control unit 502.

The relay virtual printer is implemented every time the registration information is transmitted from the image forming apparatus 101. Each of the implemented relay virtual printer is assigned with a VPID, which is a unique identifier. In the present exemplary embodiment, by identifying the VPID, the installation location of the relay virtual printer can be identified.

Now, the second processing, i.e., the processing executed by the print service printer generation unit 504 for registering information about the relay virtual printer 303 to the print service 304 will be described in detail below.

The control unit 502 transmits the user information to the print service printer generation unit 504. The print service printer generation unit 504 executes an authentication of the print server group 103 based on the received user information.

If the print server group 103 has been normally authenticated, the print service printer generation unit 504 transmits the printer name, the element <Capabilities>, and the VPID to the print service 304.

In reply to the transmitted information, the print service printer generation unit 504 receives a service printer ID (SPID). The SPID will be described in detail below. The control unit 502 acquires the VPID and the SPID from the virtual printer generation unit 503 and the print service printer generation unit 504. After receiving the VPID and the SPID, the control unit 502 outputs an instruction for storing the information on a print service information management unit 505.

The print service information management unit 505 stores the VPID, the SPID, and the registration information in association with one another as illustrated in FIG. 8B. In the example illustrated in FIG. 8B, the VPID is stored in a field 1301. A field 1302 stores the print service name. A field 1303 stores the RPID. The element <PrinterKind> is stored in a field 1304. The SPID is stored in a field 1305. A field 1306 stores the printer name. The element <Capabilities> is stored in a field 1307.

Now, the functions of the print server group 103, which are categorized in the registration function category, will be described in detail below.

The print server group 103 includes the print service 304. The print server group 103 virtualizes a plurality of servers and regards the plurality of servers as one server. The virtually provided one server implements the function of the print service 304. More specifically, the print server group 103 activates a plurality of virtual machines in one server to implement the function of the print service 304 on each virtual machine. The print service 304 illustrated in FIG. 3 illustrates one of the virtual machines. The print service 304 implements a function illustrated in FIG. 7.

Figure 7:
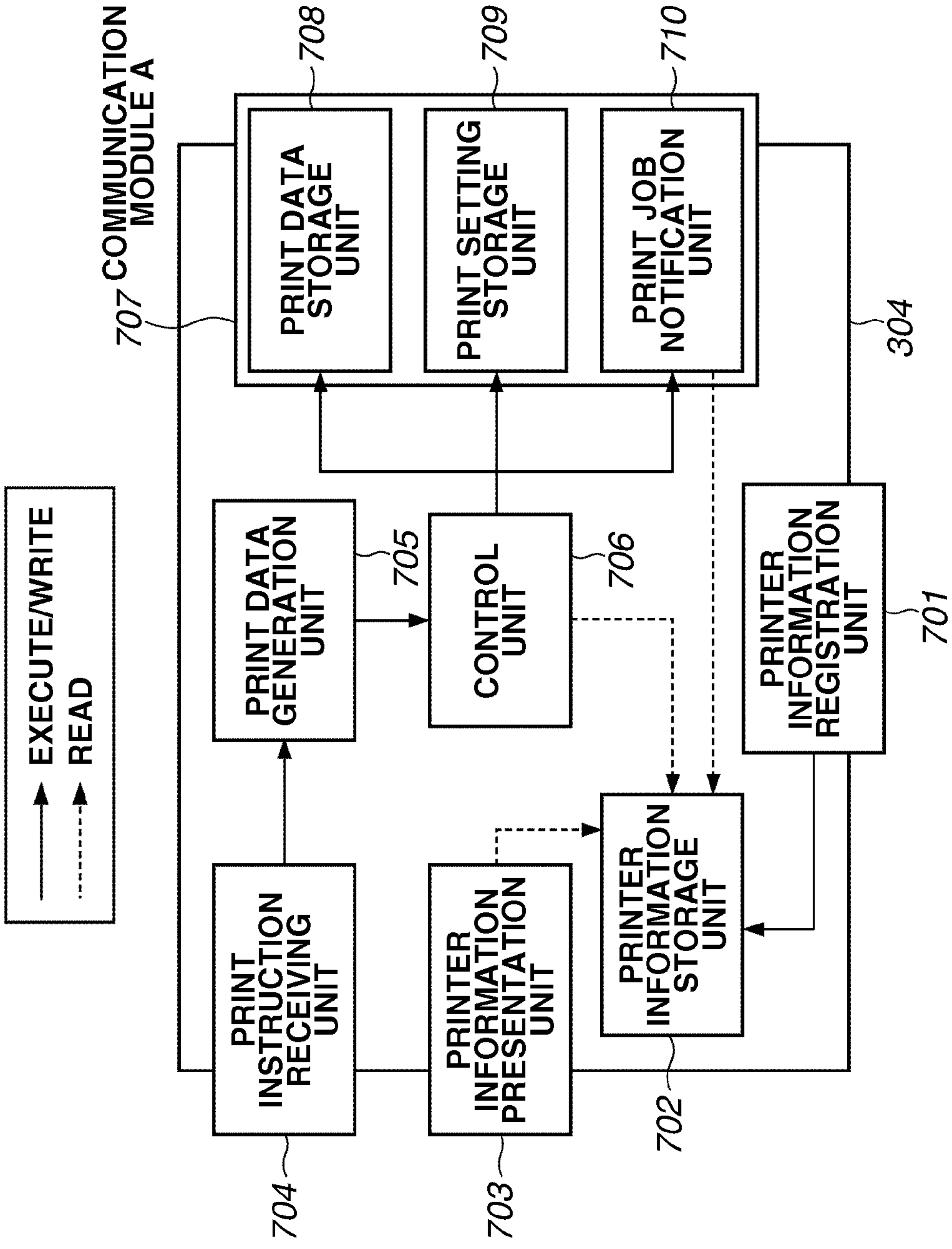
FIG. 7 illustrates exemplary functions implemented by a print service.

Referring to FIG. 7, a printer information registration unit 701 receives the user information from the print service printer generation unit 504. In addition, the printer information registration unit 701 reads the user information from a web application 306 included in the web application server group 105 and determines whether the received user information exists.

If it is determined that the received user information exists, the printer information registration unit 701 recognizes that the authentication has been normally completed. In addition, the printer information registration unit 701 receives the printer name, the element <Capabilities>, and the VPID from the print service printer generation unit 504. Furthermore, the printer information registration unit 701 outputs an instruction for storing the received VPID to the printer information storage unit 702.

In addition, the printer information registration unit 701 issues an SPID corresponding to the VPID and transmits the issued SPID to the printer information storage unit 702 and the print service printer generation unit 504. The printer information storage unit 702 stores the printer name, the element <Capabilities>, the VPID, the SPID, the user ID, and the password in association with one another.

More specifically, in the example illustrated in FIG. 8C, the printer information storage unit 702 stores various information, such as the SPID in a field 1401, the printer name in a field 1402, the element <Capabilities> in a field 1403, the VPID in a field 1404, the user ID in a field 1405, and the password in a field 1406. The other functions not described above will be described in detail below.

The above-described functions are categorized into the registration function category, which includes functions for registering the image forming apparatus 101 to the print relay server 102, implementing the relay virtual printer 303 within the print relay server 102, and registering the relay virtual printer 303 to the print service 304.

Now, the functions categorized into the print function category will be described in detail below. To begin with, the function of the client computer 104 will be described in detail below.

The client computer 104 includes a web browser 305. The web browser 305 transmits an instruction for printing the content stored in the web application server group 105 to the web application server group 105. In addition, the web browser 305 receives a command for accessing the print server group 103, i.e., a redirect instruction, from the web application server group 105. Furthermore, the web browser 305 accesses the print server group 103 according to the received redirect instruction.

In addition, the web browser 305 acquires the list of the image forming apparatuses available to the user for printing from the print server group 103, to which the web browser 305 has been accessing. Moreover, the web browser 305 displays the list of image forming apparatuses.

Figure 9B:
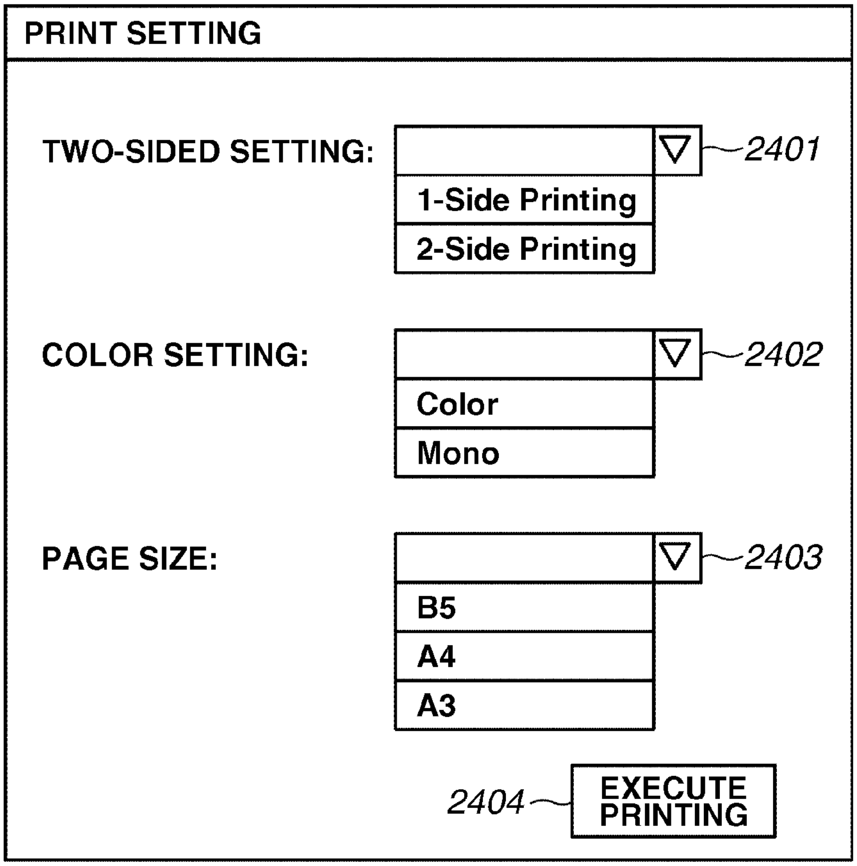
FIG. 9B illustrates an example of a print setting screen.

Furthermore, the web browser 305 acquires, from the print server group 103, a print setting screen corresponding to an image forming apparatus selected by the user among those included in the list and displays the acquired print setting screen. FIG. 9B illustrates an example of the print setting screen corresponding to the image forming apparatus selected by the user, which is to be displayed by the web browser 305. In addition, the web browser 305 transmits a print setting value set by the user set via the print setting screen to the print server group 103.

The web browser 305 included in the client computer 104 operates in the above-described manner.

Now, the function of the web application server group 105 will be described in detail below.

The web application server group 105 includes the web application 306. The web application 306 virtualizes a plurality of servers and regards the plurality of servers as one server. The virtually provided one server implements the function of the web application 306. More specifically, the web application server group 105 activates a plurality of virtual machines in one server to implement the function of the web application 306 on each virtual machine.

The web application 306 provides a document generation service. For example, when the user is to distribute documents in a corporate meeting, the user can utilize the document generation service to generate the documents.

If the client computer 104 utilizes the web application 306, it is not necessary to install the application into the client computer 104. In other words, in this case, it is required for the client computer 104 to merely include the web browser 305.

The web application 306 transmits screen information used for generating the document to the web browser 305. The web application 306 authenticates the user based on the user information including the user ID and the password input by the user. If the user is normally authenticated, the web application 306 transmits the screen information for generating the document.

After receiving the screen information, the web browser 305 displays a document generation screen for generating the document based on the screen information. In addition, the user generates the document to be distributed in the meeting by using the document generation screen.

The web application 306 receives the information about the document generated by the user by using the document generation screen. In addition, the web application 306 generates a content of the document based on the received information. Furthermore, the web application 306 stores the generated content on a storage device of the web application server group 105.

The web application 306 provides an e-mail service and a schedule service as well as the document generation service.

If the user desires to print the content generated by utilizing the document generation service, the user can execute printing by pressing a print button 1201 (FIG. 12) displayed on the document generation screen.

Figure 12:
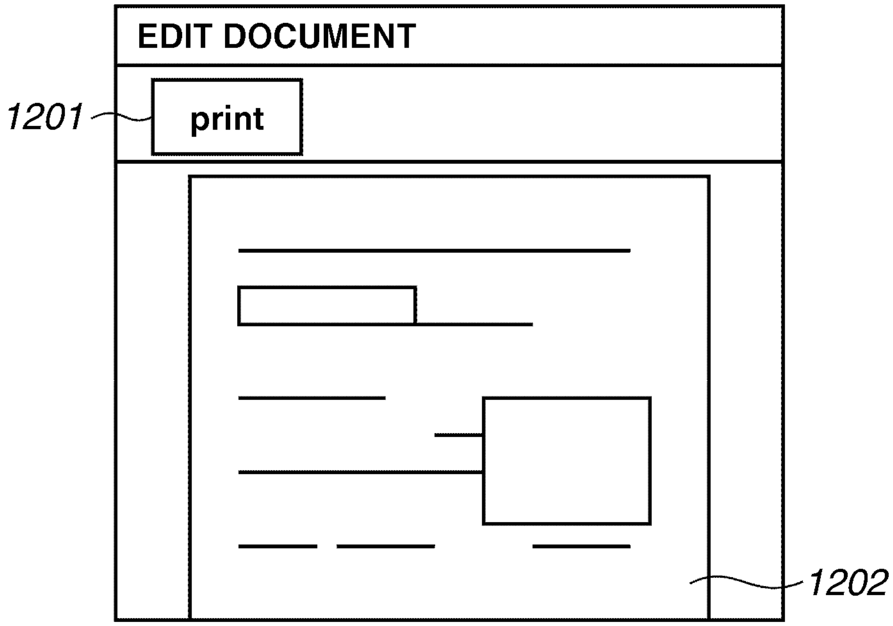
FIG. 12 illustrates an exemplary screen displayed when a print button is pressed.

FIG. 12 illustrates an exemplary screen displayed when the print button 1201 is pressed. Referring to FIG. 12, the screen displays a content 1202, which has been generated by the user. The web application 306 receives information indicating that the print button has been pressed. In addition, the web application 306 transmits an access command for accessing to the print server group 103, i.e., a redirect instruction, to the web browser 305.

The redirect instruction includes a request for acquiring the list corresponding to the user who is utilizing the above-described web browser 305, content identification information for identifying the content instructed by the user to be printed, and the user information.

Furthermore, if a request for acquiring a content is received from the print server group 103, the web application 306 transmits the requested content to the print server group 103, which is identified based on the content identification information for identifying the content received together with the content acquisition request.

The web application 306 included in the web application server group 105 operates in the above-described manner.

The functions of the print server group 103 that are categorized into the print function category will be described in detail below.

Referring to FIG. 7, the print service 304 included in the print server group 103 includes a printer information presentation unit 703. When the list acquisition request is received from the web browser 305, the printer information presentation unit 703 transmits the requested list to the web browser 305. The printer information presentation unit 703 identifies the SPID and the printer name stored by the printer information storage unit 702 based on the user information.

In addition, the printer information presentation unit 703 generates a list of the image forming apparatuses available to the user based on the SPID and the printer name. Furthermore, the printer information presentation unit 703 receives the SPID of the image forming apparatus selected by the user from among those included in the list.

Moreover, the printer information presentation unit 703 identifies the element <Capabilities> stored by the printer information storage unit 702 based on the received SPID. In addition, the printer information presentation unit 703 generates a print setting screen and transmits the generated print setting screen to the web browser 305.

The printer information storage unit 702 generates a print setting screen illustrated in FIG. 9B based on the information described in the element <Capabilities> (FIG. 8C). Referring to FIG. 9B, the printer information storage unit 702 generates a print setting screen via which the user can select the print setting described in the element <Capabilities> only.

A print instruction receiving unit 704 (FIG. 7) receives the print setting set via the print setting screen and the SPID from the web browser 305. In addition, if the web browser 305 has accessed the print service 304 based on the redirect instruction, the print instruction receiving unit 704 receives content identification information for identifying the content instructed by the user to be printed.

A print data generation unit 705 receives the content identification information from the print instruction receiving unit 704. In addition, the print data generation unit 705 acquires the content to be printed from the web application 306 based on the received content identification information.

Furthermore, the print data generation unit 705 receives the print setting input by the user via the print instruction receiving unit 704 and the SPID corresponding to the image forming apparatus selected by the user. In addition, the print data generation unit 705 converts the content into print data based on the content and the print setting acquired from the web application 306.

The control unit 706 acquires the print data, the print setting, and the SPID from the print data generation unit 705. The print setting is described in the XML format as illustrated in FIG. 10B. Referring to FIG. 10B, in the present exemplary embodiment, it is supposed that the user has set the two-sided setting, the monochromatic printing, and the paper size A4.

The communication module A 707 can communicate with an apparatus having the communication module A' 601. The communication module A 707 is an interface for data communication with the apparatus having the communication module A' 601. The communication module A' 601 cannot communicate with the communication module A 707 because of reasons that will be described after describing the functions of the communication module A 707.

The communication module A 707 includes a print data storage unit 708, a print setting information storage unit 709, and a print job notification unit 710. The print data storage unit 708 receives the print data from the control unit 706 and stores the received print data. The print setting information storage unit 709 receives the print setting from the control unit 706 and stores the received print setting. The print data storage unit 708 and the print setting information storage unit 709 receive a storage instruction from the control unit 706 and execute storage processing.

When it is notified from the print data storage unit 708 and the print setting information storage unit 709 that the storage has been completed, the control unit 706 issues an instruction to the print job notification unit 710 for transmitting notification information. When the instruction for transmitting notification information is received from the control unit 706, the print job notification unit 710 acquires the SPID from the control unit 706. In addition, the print job notification unit 710 identifies the VPID based on the information stored on the printer information storage unit 702.

In the present exemplary embodiment, information about the transmission source apparatus corresponding to the SPID, i.e., the VPID in the present exemplary embodiment is referred to as a “target”. The user designates the VPID by selecting the SPID.

In addition, the print job notification unit 710 acquires the storage locations of the print data and the print setting from the control unit 706. Furthermore, the print job notification unit 710 generates notification information A. Furthermore, the print job notification unit 710 transmits the notification information A to the image forming apparatus to be registered.

The print job notification unit 710 is equivalent to a first transmission unit. The information that transmitted by the print job notification unit 710 is equivalent to information about data.

The information about the data according to the present exemplary embodiment is the notification information A. However, the information about the data includes information and data other than the notification information A according to a specification of the communication. This applies to notification information B, which will be described in detail below. In the present exemplary embodiment, the registered image forming apparatus refers to a relay virtual printer, which corresponds to the VPID.

The notification information A is expressed in the XML format illustrated in FIG. 10C. Referring to FIG. 10C, an element <Item> 1701 describes the storage location of the print data. An element <Item> 1702 describes the storage location of the print setting.

The communication module other than the communication module A' 601 cannot communicate with the communication module A 707 due to the following reason. More specifically, the communication module other than the communication module A' 601 cannot interpret the notification information A, which is received from the print job notification unit 710 and expressed in the XML format.

In addition, in the following case, the communication module other than the communication module A' 601 cannot communicate with the communication module A 707.

For example, if the communication module A 707 does not include the print job notification unit 710 and if the communication module A 707 acquires the print data and the print setting by a different method, the communication module A' 601, which acquires the notification information A, cannot acquire the print data and the print setting.

This is because the communication module A' 601, which acquires the notification information A, has been currently waiting for the notification information A to be transmitted from the communication module A 707 and the print data and the print setting cannot be acquired until the communication module A 707 is notified.

It is required for the communication module A' 601 that the communication module A' 601 have a configuration for inquiring the communication module A 707 whether data to be acquired exists. As described above, if the communication module A' 601 does not comply with the data communication specification of the communication module A 707, the communication module A 707 cannot communicate with the communication module A' 601.

In the present exemplary embodiment, a method that enables the communication between the communication module A 707 and the communication module A' 601 is referred to as a “specification of a vendor that provides the print server group 103”. The specification greatly depends on the vendor that manages the print server group 103.

The vendor that manages the print server group 103 implements the communication module A 707 on the print server group 103. In addition, the vendor that manages the print server group 103 publishes the communication module A' 601 for communicating with the communication module A 707.

In fact, the above-described system has been actually established. The vendor that manages the print server group 103 has published a unique specification that enables data communication between the print server group 103 and a device.

Under these circumstances, it is required for a device vendor of the image forming apparatus 101 to install the communication module A' 601 on the image forming apparatus 101 to enable the image forming apparatus 101 to communicate with the print server group 103.

Suppose that the vendor that manages the print server group 103 has changed the configuration of the communication module A 707. In other words, suppose that the vendor that manages the print server group 103 has changed the specification.

In this case, the device vendor is required to change the communication module A' 601 of the image forming apparatus 101 due to the change in the specification. The load of the communication module changing operation is very high. This is because the image forming apparatuses may be installed in various customer environments and in order to enable the communication between the print server group 103 and the image forming apparatus again, it is required that a service engineer visit the various customer environments to change the communication module A' 601.

If the above-described problem is to be solved by transmitting the communication module A' 601 without sending the service engineer carrying the communication module A' 601 to each customer environment, the load on the communication band may become high because it is required to transmit the communication module A' 601 to a plurality of image forming apparatuses. The above-described problem can be solved by using the functions of the print relay server 102 categorized in the print function category.

The specification of the data communication that the vendor that manages the print server group 103 publishes is equivalent to a first specification. The interface for the communication between the communication module A 707 and the communication module A' 601 is generated in compliance with the first specification.

Figure 6:
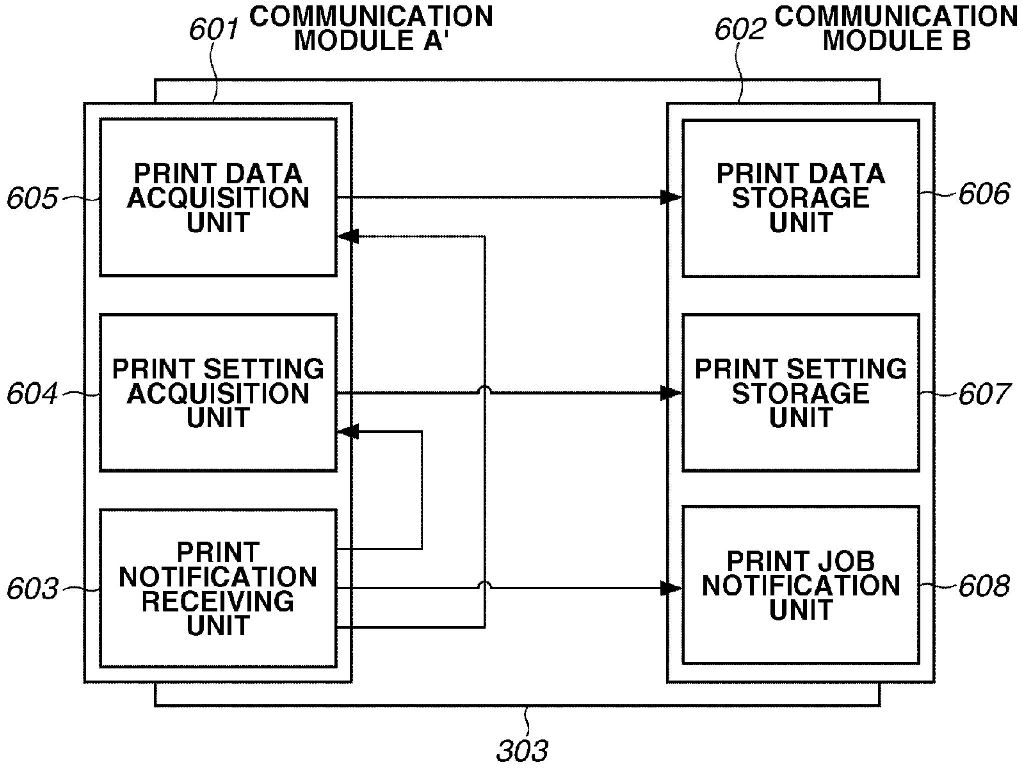
FIG. 6 illustrates exemplary functions implemented by a relay virtual printer.

The functions categorized in the print function category of the print relay server 102 will be described in detail below. Referring to FIG. 6, the relay virtual printer 303 includes the communication module A' 601 and the communication module B 602.

A print notification receiving unit 603 of the communication module A' 601 receives the notification information A transmitted from the print job notification unit 710. Because the relay virtual printer 303, instead of the RPID of the image forming apparatus 101, has been registered to the print service 304, the notification information A is transmitted to the print notification receiving unit 603.

Because the communication module A' 601 is used as a pair of modules with the communication module A 707, the print notification receiving unit 603 can interpret the notification information A. The print notification receiving unit 603 is equivalent to a first acquisition unit.

The print notification receiving unit 603 verifies the storage locations of the print data and the print setting by referring to the notification information A. In addition, the print notification receiving unit 603 notifies the print setting and the print data to a print setting acquisition unit 604 and a print data acquisition unit 605, respectively.

The print setting acquisition unit 604 acquires the print setting from the print setting storage unit 709 based on the notified print setting storage location. The print data acquisition unit 605 acquires the print data from the print data storage unit 708 based on the notified print data storage location.

The print data acquisition unit 605 outputs an instruction to a print data storage unit 606 for storing the print data that the print data acquisition unit 605 has acquired. The print setting acquisition unit 604 outputs an instruction to a print setting storage unit 607 for storing the print setting that the print setting acquisition unit 604 has acquired.

After storing the print data, the print data storage unit 606 notifies the print data storage location to a print job notification unit 608. On the other hand, after storing the print setting, the print setting storage unit 607 notifies the print setting storage location to the print job notification unit 608.

When the print data storage location and the print setting storage location are notified by the print data storage unit 606 and the print setting storage unit 607, the print job notification unit 608 generates notification information B. The notification information B is expressed in the XML format illustrated in FIG. 10D. Referring to FIG. 10D, an element <Item> 1703 describes the print data storage location. An element <Item> 1704 describes the print setting storage location.

The print job notification unit 608 transmits the notification information B to the print control unit 301. The print job notification unit 608 is equivalent to a second transmission unit.

In the above-described manner, the upstream communication module A' 601 transmits the print data and the print setting to the downstream communication module B 602 to implement the communication between the modules.

The communication module B' 410, which corresponds to the communication module B 602, is implemented on the image forming apparatus 101. As described above, the image forming apparatus 101 acquires the print data from the print relay server 102 via the print server group 103. Accordingly, even if the communication module A' 601 is changed because the communication module A 707 has been changed, the notification information can be transmitted to the image forming apparatus 101 by changing the communication module A' 601 of the print relay server 102.

In other words, even if the vendor that manages the print server group 103 has changed the unique specification for the data communication between the print server group 103 and the image forming apparatus 101, the device vendor is not required to change the communication module of the image forming apparatus 101. By changing the virtual printer 303 of the print relay system 102, the device vendor can implement the communication between the image forming apparatus 101, which is installed in various user environments, and the print server group 103.

The virtual printer 303 can be changed by changing the communication module A' 601 of the relay virtual printer 303. Alternatively, the relay virtual printer 303 can be changed to a newly generated virtual printer 303. In this case, the existing virtual printer 303 is discarded.

Now, the function categorized in the print function category of the image forming apparatus 101 will be described in detail below.

Referring to FIG. 4, the print control unit 301 includes the communication module B' 410. A print notification receiving unit 404 of the communication module B' 410 receives the notification information B, which is transmitted from the print job notification unit 608. The print notification receiving unit 404 is equivalent to a second acquisition unit.

Because the communication module B' 410 is used as a pair of modules with the communication module B 602, the print notification receiving unit 404 can interpret the notification information B.

The specification specified by the device vendor to provide data communication between the relay virtual printer 303 and the image forming apparatus 101 is equivalent to a second specification and is the specification that can be handled by the device vendor. The interface for the communication between the communication module B 602 and the communication module B' 410 is generated in compliance with the second specification.

The print notification receiving unit 404 verifies the print setting storage location and the print data storage location described in the notification information B. In addition, the print notification receiving unit 404 notifies the print setting storage location and the print data storage location to a print setting acquisition unit 405 and a print data acquisition unit 406.

The print setting acquisition unit 405 acquires the print setting from the print setting storage unit 606 based on the notified print setting storage location. The print data acquisition unit 406 acquires the print data from the print data storage unit 607 based on the notified print data storage location.

The acquired print setting and the print data are transmitted to a job management unit 407 via the print notification receiving unit 404. The job management unit 407 acquires the print data and the print setting information and instructs a print execution unit 408 to execute printing.

After receiving the print instruction, the print execution unit 408 instructs the printing unit (not illustrated) to generate a raster image based on the print setting and the print data and to print the generated raster image.

In the above-described manner, the functions included in the print function category execute printing of the print data transmitted from the print server group 103 by using the image forming apparatus according to an instruction transmitted to the print server group 103 for printing the content generated by the web application server group 105.

Now, processing for registering the image forming apparatus 101 to the print relay server 102, for implementing the relay virtual printer 303 within the print relay server 102, and for registering the relay virtual printer 303 to the print service 304 will be described in detail below with reference to FIG. 13.

Figure 13:
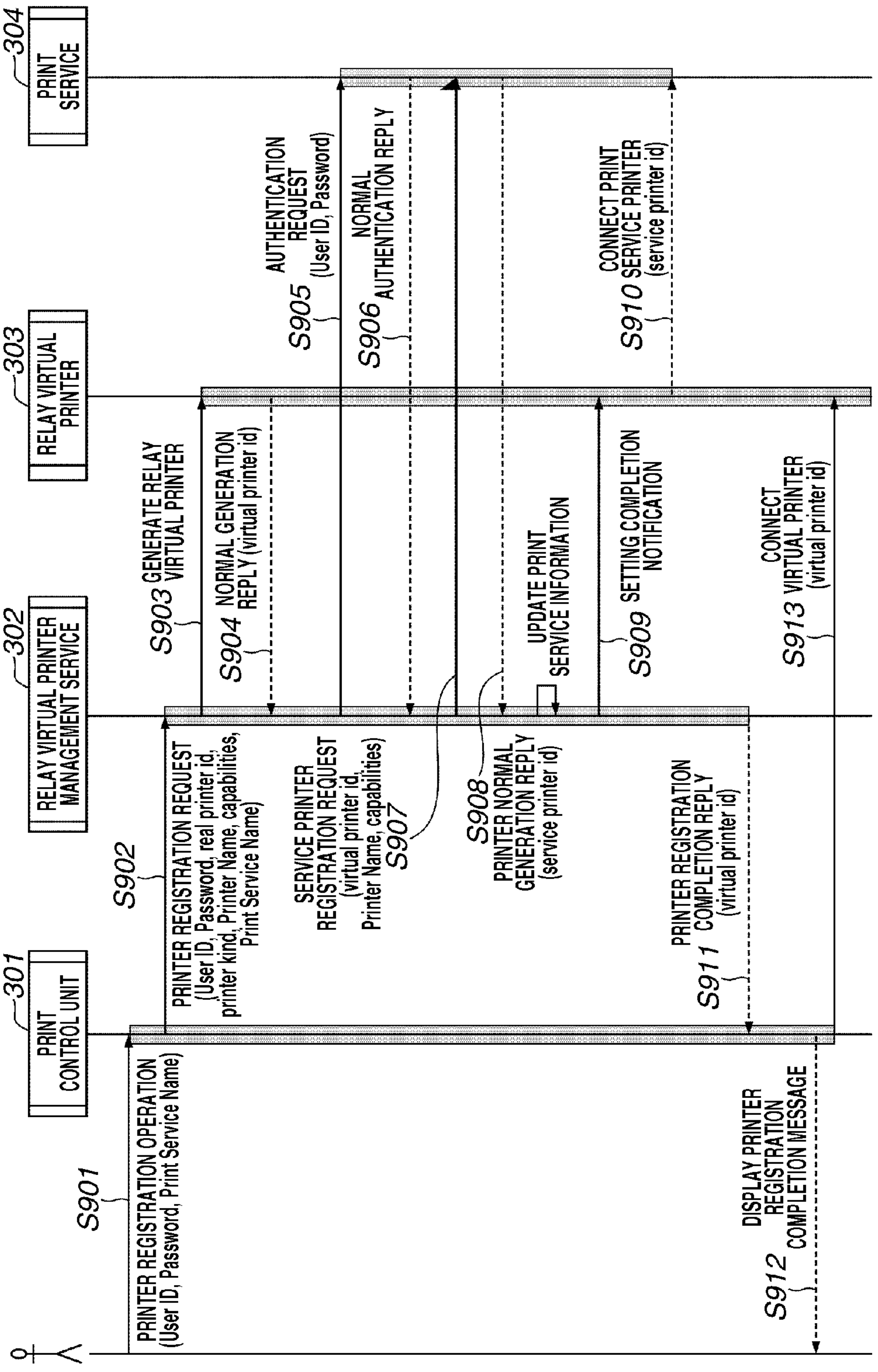
FIG. 13 is a sequence chart illustrating exemplary processing for registering a relay virtual printer to a print service.

Referring to FIG. 13, in step S901, the user selects a print service to be registered via the UI of the image forming apparatus 101 and inputs the user ID and the password. In step S902, the print control unit 301 of the image forming apparatus 101 requests the relay virtual printer management service 302 to register the printer. In requesting the registration of the printer to the relay virtual printer management service 302, the display unit 301 transmits the notification information to the relay virtual printer management service 302.

In step S903, the relay virtual printer management service 302 implements the relay virtual printer 303 based on the registration information. In step S904, the relay virtual printer 303 transmits the VPID to the relay virtual printer management service 302 in reply to a notification of normal generation of the relay virtual printer.

In step S905, the relay virtual printer management service 302 transmits the user ID and the password to the print service 304 and to authenticate the user. If the user is normally authenticated by the print service 304 in step S905, the processing advances to step S906.

In step S906, the print service 304 notifies the relay virtual printer management service 302 that the user has been normally authenticated. In step S907, the relay virtual printer management service 302 requests the print service 304 to register the VPID as the printer provided by the print service 304 (service printer).

In step S908, after registering the VPID as the service printer, the print service 304 issues an SPID and transmits the SPID to the relay virtual printer management service 302.

In step S909, the relay virtual printer management service 302 instructs the print service information storage unit 703 to store the SPID. In addition, the relay virtual printer management service 302 notifies the relay virtual printer 303 that the setting has been completed.

In step S910, the relay virtual printer 303 accesses and connects to the communication module A 707 of the print service 304 based on the SPID and waits until the notification information A is transmitted. In step S911, the relay virtual printer management service 302 notifies the print control unit 301 that the registration of the printer has been completed.

In step S912, the print control unit 301 outputs an instruction for displaying a message indicating that the image forming apparatus has been completely registered on the UI of the image forming apparatus 101. In step S913, the print control unit 301 accesses and connects to the relay virtual printer 303 based on the VPID and waits until the notification information B is transmitted. The image forming apparatus is registered in the above-described manner.

Now, processing for printing the print data transmitted from the print server group 103 by using the image forming apparatus according to an instruction transmitted to the print server group 103 for printing the content generated by the web application server group 105 will be described in detail below with reference to FIG. 14.

Figure 14:
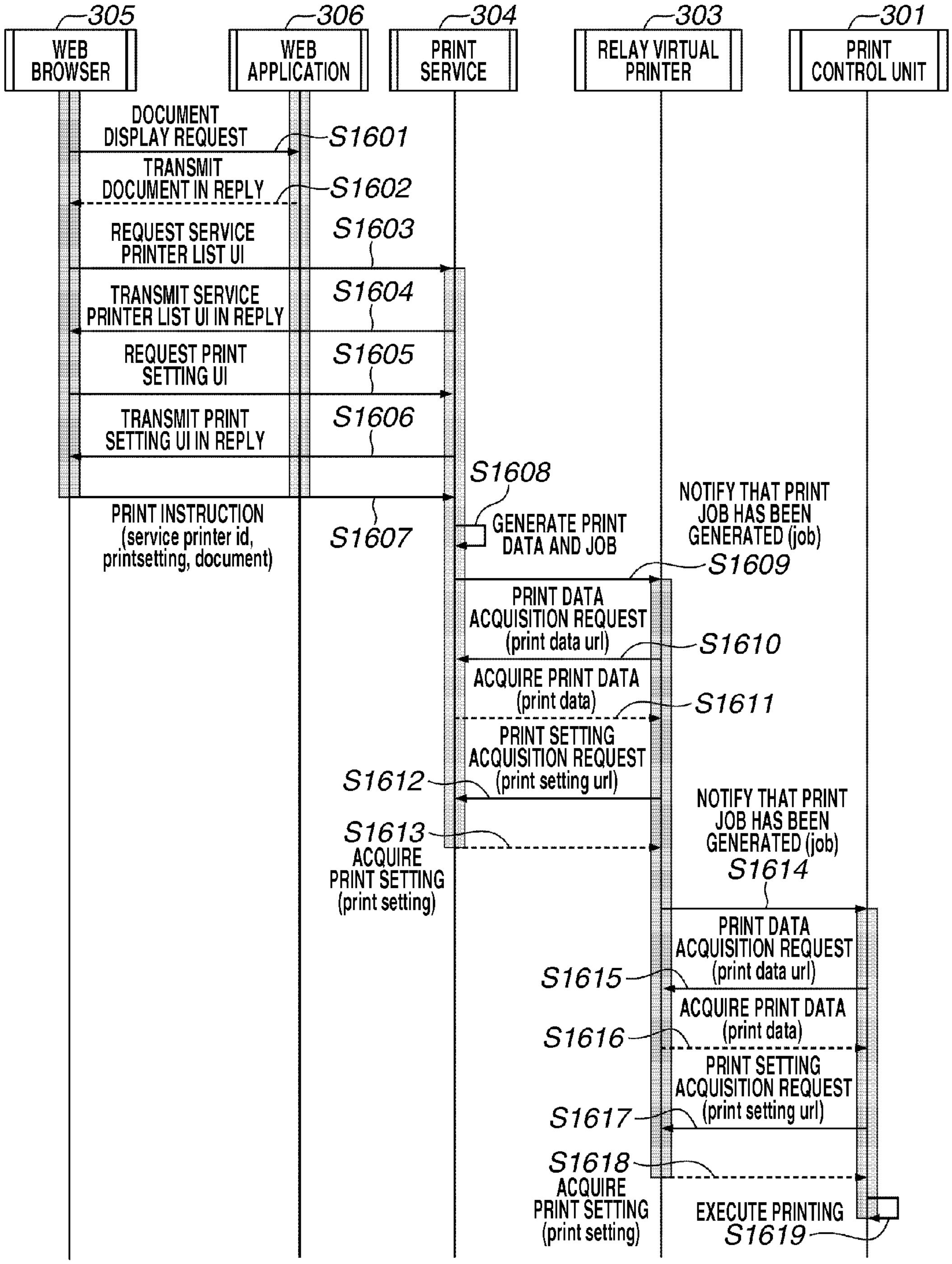
FIG. 14 is a sequence chart illustrating exemplary processing for printing print data received from print servers on an image forming apparatus.

Referring to FIG. 14, in step S1601, the web browser 305 requests the web application 306 to display the content that the user desires to edit. In step S1602, the web application 306 transmits a content screen corresponding to the requested content to the web browser 305.

In step S1603, when the user inputs a print instruction via the content screen, the web browser 305 requests an image forming apparatus (service printer) list screen, which displays a list of image forming apparatuses (service printer) registered to the print service 304. In step S1604, the print service 304 transmits the screen displaying the list of service printers corresponding to the user who utilizes the web browser 305 to the web browser 305.

In step S1605, when the user has selected the desired image forming apparatus from among the image forming apparatuses displayed on the image forming apparatus list screen, the web browser 305 requests a print setting screen corresponding to the selected image forming apparatus to the print service 304. In step S1606, the print service 304 transmits the print setting screen to the web browser 305.

In step S1607, the web browser 305 transmits the print setting that has been input by the user via the print setting screen to the print service 304. In step S1608, the print service 304 acquires the content whose printing has been instructed by the user from the web application 305. In addition, the print service 304 converts the acquired content into print data based on the received print setting. Furthermore, the print service 304 combines the converted print data and the print setting into a job.

In step S1609, the print service 304 notifies the relay virtual printer 303 that the job has been generated. In step S1610, the relay virtual printer 303 requests the print service 304 to transmit the print data. In step S1611, the relay virtual printer 303 acquires the print data from the print service 304. In step S1612, the relay virtual printer 303 requests the print service 304 to transmit the print setting. In step S1613, the relay virtual printer 303 acquires the print setting from the print service 304.

In step S1614, the relay virtual printer 303 notifies the display unit 301 that the job has been generated. In step S1615, the print control unit 301 requests the relay virtual printer 303 to transmit the print data. In step S1616, the print control unit 301 acquires the print data from the relay virtual printer 303. In step S1617, the print control unit 301 requests the relay virtual printer 303 to transmit the print setting. In step S1618, the print control unit 301 acquires the print setting from the relay virtual printer 303.

In step S1619, the print control unit 301 draws a raster image based on the acquired print setting and the print data and controls the image forming apparatus 101 to print the raster image.

The following effects can be achieved by the above-described configuration.

In other words, even if the specification of the interface for the server implementing the print service to provide the print service has been changed, it is possible to comply with the latest specification without changing the specification of the interface of the image forming apparatus.

In the present exemplary embodiment, the print server group 103 generates the print setting screen by using the element <Capabilities> described in the XML format. However, the format of the element <Capabilities> is not limited to this.

More specifically, in generating the print setting screen, the element <Capabilities> can be described in the JSON format illustrated in FIG. 10A. In this case, the element <Capabilities> can be acquired from the image forming apparatus 101.

In the present exemplary embodiment, the client computer 104 transmits the print setting described in the XML format to the print server group 103. However, the format of the print setting is not limited to this. More specifically, the print setting transmitted from the client computer 104 to the print server group 103 can be described in the JSON format illustrated in FIG. 10B.

Furthermore, in the present exemplary embodiment, the notification information A and the notification information B are generated in the same format, i.e., the XML format. However, the notification information A and the notification information B can be described in mutually different formats. For example, the notification information A can be expressed in the JSON format illustrated in FIG. 11C.

In the example illustrated in FIG. 11C, an element 1801 describes the print data storage location. An element 1802 describes the print setting storage location. The descriptions of the elements 1801 and 1802 can be vice versa as well. For example, the notification information A can be expressed in the XML format while the notification information B can be expressed in the JSON format illustrated in FIG. 11D. In the example illustrated in FIG. 11D, an element 1803 describes the print data storage location. An element 1804 describes the print setting storage location.

Program codes itself, which are installed to a computer for implementing the functional processing of the present invention with the computer, implement the present invention. To paraphrase this, the present invention also includes the computer program implementing the functional processing of the present invention. Accordingly, the program can be configured in any form, such as object code, a program executed by an interpreter, and script data supplied to an operating system (OS).

In a second exemplary embodiment of the present invention, it is supposed that a plurality of print services exists in the content printing system 1000 and that the print services have different communication specifications.

Figure 15:
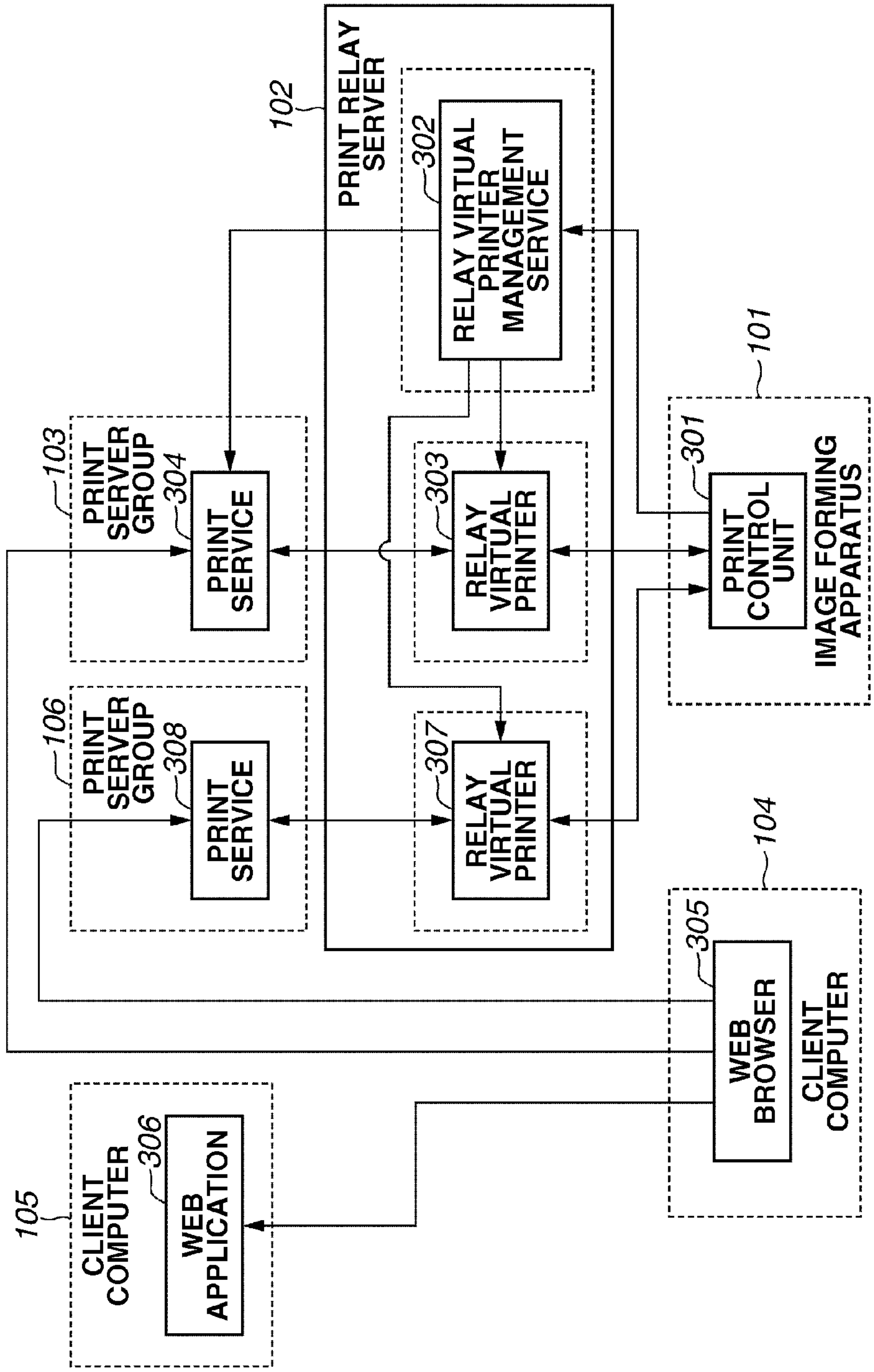
FIG. 15 illustrates an exemplary software configuration of each apparatus and each server group, which are included in the content printing system, according to a second exemplary embodiment of the present invention.

FIG. 15 illustrates an exemplary hardware configuration of each apparatus and each server group, which are included in the content printing system 1000, according to the present exemplary embodiment.

The content printing system 1000 according to the present exemplary embodiment includes a print server group 106 in addition to the configuration of the first exemplary embodiment described above. Furthermore, as the software configuration, the content printing system 1000 according to the present exemplary embodiment includes a relay virtual printer 307 and a print service 308 in addition to the configuration of the first exemplary embodiment.

The relay virtual printer 307 is implemented by the relay virtual printer management service 302. An exemplary method for implementing the relay virtual printer 307 will be described in detail below. Suppose that the user has requested the relay virtual printer management service 302 to register the image forming apparatus 101 to a printer service B, i.e., to the print service 308. In this case, the virtual printer generation unit 503 identifies the communication module B 602, which has been stored in the interface information management unit 506, based on the element <PrinterKind> transmitted from the control unit 706.

In addition, the virtual printer generation unit 503 identifies and acquires the communication module A' 601 stored on the interface information management unit 506 based on the print service name.

Because the communication module B is a module for communicating with the image forming apparatus 101 and the image forming apparatuses of the same model have the communication module B 602, the virtual printer generation unit 503 can identify the communication module B 602 by referring to the element <PrinterKind>. The communication module B 602 communicates with the communication module B' 410 of the print control unit 301. The communication module A' 601 is a module for communicating with the print server group 103 and is capable of communicating with the communication module A 707 of the print service 308.

After acquiring the two communication modules, the virtual printer generation unit 503 implements a process (thread) in which the two communication modules are loaded. The process is equivalent to the relay virtual printer 307.

FIG. 16A illustrates an example of the notification information A received by the communication module A 707. FIG. 16B illustrates an example of the print setting received by the communication module A 707. Referring to FIGS. 16A and 16B, the notification information A and the print setting that the communication module A 707 corresponding to the print service 308 receives differ from those received by the communication module A 707 corresponding to the print service 304.

As can be known from the example illustrated in FIGS. 16A and 16B, if the information is described in the same XML format, the communication with the print service cannot be implemented if the tag names are different.

Both the communication modules A 707 can receive the print setting and the print data by the same method. However, alternatively, the communication modules A 707 can use different method for receiving the print setting and the print data. To paraphrase this, as described above in the first exemplary embodiment, the print setting and the print data can be acquired by periodical polling to the print service if no configuration for acquiring the notification information A is provided.

In the present exemplary embodiment, a plurality of relay virtual printers is used, whose interfaces for the communication module A 707 are different and in which the communication modules B use the same interface. With the above-described configuration, the present exemplary embodiment can accommodate the difference in the communication specifications in a plurality of print services by using the print relay server 102.

Accordingly, even if any communication specification of a multiple of print services has been changed, it is possible to deal with a change in the communication specification without changing the specification of the image forming apparatus 101.

The present exemplary embodiment has the configuration of the content printing system 1000 similar to the configuration of the content printing system 1000 according to the first exemplary embodiment except the configuration described above. In addition, the content printing system 1000 according to the present exemplary embodiment executes the registration processing and the print processing in a similar manner to those described above in the first exemplary embodiment except the processing described above in the present exemplary embodiment.

Furthermore, the print server group 106 and the print server group 103 have the same function. In addition, the relay virtual printer 303 and the relay virtual printer 307 have the same function.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-164057 filed Jul. 21, 2010, which is hereby incorporated by reference herein in its entirety.

What is claimed is:

1. A print relay system capable of connecting to an image forming apparatus and a print service system, wherein the print service system is provided by a first vendor that releases a unique specification for executing data communication between the print service system and the image forming apparatus, the print relay system comprising:

a receiving unit configured to acquire, in response to the print service system receiving a printing instruction input by a user via a client, data from the print service system according to a first specification, which is the unique specification of the first vendor that also is for data communication between the print service system and a relay virtual printer; and a transmission unit configured to transmit the data acquired by the receiving unit from the relay virtual printer to the image forming apparatus according to a second specification for executing data communication between the relay virtual printer and the image forming apparatus, wherein the second specification is released by a second vendor that provides the print relay system and is other than the first vendor, wherein the receiving unit is a first receiving unit, the print relay system further comprising a generation unit configured to generate, in response to receiving information indicating that the first vendor changed the unique specification, a newly generated second receiving unit that is configured to acquire, in response to the print service system receiving a printing instruction input by a user via a client, data from the print service system according to the changed unique specification and to replace the receiving unit with the newly generated second receiving unit to communicate with the print service system.

2. The print relay system according to claim 1, wherein the receiving unit is implemented by a first communication module configured to communicate with the print service system, wherein the transmission unit is implemented by a second communication module configured to communicate with the image forming apparatus, the print relay system further comprising:

an inter-module communication unit configured to transmit the data acquired from the print service system within the relay virtual printer, from the first communication module configured to communicate with the print service system to the second communication module configured to communicate with the image forming apparatus.

3. The print relay system according to claim 2, further comprising a generation unit configured to generate, in response to receiving information indicating that the first vendor changed the unique specification, a newly generated relay virtual printer that uses a third communication module compliant with the changed unique specification and to replace the first communication module with the third communication module as the communication module configured to communicate with the print service system.

4. A content printing system comprising:

a print server group including a print service, wherein the print service includes a communication module A configured to execute data communication with a target designated by a user, wherein the communication module A includes a first transmission unit configured to transmit information about print data to the target designated by the user; an image forming apparatus including a print control unit and a communication module B'; and a print relay system including a relay virtual printer configured to serve as an intermediary in data communication between the print server group and the image forming apparatus, wherein the relay virtual printer includes:

a communication module A' configured to execute data communication with the print service through the communication module A and configured to be used as a pair with the communication module A, wherein the communication module A' includes a first receiving unit configured to acquire the print data based on the information transmitted from the first transmission unit, and a communication module B configured to execute data communication with the image forming apparatus through the communication module B' and configured to be used as a pair with the communication module B', wherein the communication module B includes a second transmission unit configured to transmit the information about the print data acquired by the first receiving unit to the image forming apparatus, wherein the communication module B' of the image forming apparatus includes a second receiving unit configured to acquire the print data from the print relay system based on the information transmitted from the second transmission unit of the communication module B of the relay virtual printer.

5. A method for controlling a print relay system capable of connecting to an image forming apparatus and a print service system, wherein the print service system is provided by a first vendor that releases a unique specification for executing data communication between the print service system and the image forming apparatus, the method comprising:

acquiring, in response to the print service system receiving a printing instruction input by a user via a client, data from the print service system according to a first specification, which is the unique specification of the first vendor that also is for data communication between the print service system and a relay virtual printer;

transmitting the acquired data from the relay virtual printer to the image forming apparatus according to a second specification for executing data communication between the relay virtual printer and the image forming apparatus, wherein the second specification is released by a second vendor that provides the print relay system and is other than the first vendor, wherein the acquiring is a first acquiring; and generating, in response to receiving information indicating that the first vendor changed the unique specification, a newly generated second acquiring to acquire, in response to the print service system receiving a printing instruction input by a user via a client, data from the print service system according to the changed unique specification and to replace the first acquiring with the newly generated second acquiring to communicate with the print service system.

6. A non-transitory computer-readable storage medium storing a program that causes a print relay system to perform the method according to claim 5.

* * * * *